United States Patent
Nguyen

[11] Patent Number: 5,703,695
[45] Date of Patent: Dec. 30, 1997

[54] MULTI-DOT DITHER MATRIX GENERATION

[76] Inventor: Hugh P. Nguyen, 1353 Cabrillo Ave., San Jose, Calif. 95132

[21] Appl. No.: 407,444

[22] Filed: Mar. 20, 1995

[51] Int. Cl.$^6$ .................................................. H04N 1/40
[52] U.S. Cl. ........................................ 358/298; 358/457
[58] Field of Search ........................... 358/298, 454–457, 358/533–535; 395/109, 112, 128; 382/254, 276, 282, 299, 302, 307, 308

[56] References Cited

U.S. PATENT DOCUMENTS

| | | | |
|---|---|---|---|
| 4,651,228 | 3/1987 | Koch | 358/298 |
| 4,937,677 | 6/1990 | van Dorsselaer | 358/456 |
| 5,005,139 | 4/1991 | Tung | 364/519 |
| 5,125,045 | 6/1992 | Murakami et al. | 358/457 X |
| 5,387,985 | 2/1995 | Lace et al. | 358/455 X |
| 5,479,175 | 12/1995 | Cianciosi et al. | 358/298 X |

*Primary Examiner*—Peter S. Wong
*Assistant Examiner*—Eric Frahm

[57] ABSTRACT

An improved multi-dot halftoning method to print a non-text halftone image from a non-text gray-scale image by comparing the gray-scale image to a transformed dither matrix to generate and to print the halftone image. The transformed dither matrix is tuned to reduce undesirable artifacts in the printed image. In one set of process steps to generate the transformed dither matrix, an original dither matrix with a number of original levels is picked. A selected number of the original matrix is tiled to build the large dither matrix. The large dither matrix is then transformed by operating on every original level in the large dither matrix. Each original level is split to create a group of finer levels that are in sequence and are all different from each other. A processor then replaces that original level in each of the tiled matrices by one of the finer levels such that the sequence of finer levels follows a pattern in the large dither matrix. This step of replacement is repeated for all the possible patterns; and the pattern that creates the most visually-pleasing image is selected for that original level. After the step of selecting all the patterns comes the step of incorporating all the selected patterns into the large dither matrix to form the transformed dither matrix for printing the non-text image.

12 Claims, 12 Drawing Sheets

MULTI-DOT DITHER MATRIX GENERATION

BACKGROUND

The present invention relates generally to methods of generating and printing a halftone-non-text image, and more particularly to methods of generating a dither matrix to print the image.

Digital halftoning is a method of rendering the illusion of continuous tone pictures on binary displays, such as printers. Ordered dither is one class of digital halftoning methods that renders the pictures by thresholding their gray levels with deterministic threshold arrays, known as dither matrices. The size of the dither matrix plays a major role in the quality of the binary output. If the matrix is too small, the output exhibits artificial contours due to the limited number of gray levels the matrix can produce. On the other hand, while a larger matrix can eliminate the contours, its coarser halftone structures are considered less visually pleasing.

Multi-dot halftoning is a process that duplicates an original dither matrix and combines them into a large dither matrix with more gray levels. Although the resultant dither matrix is larger than the original dither matrix, the large dither matrix has halftone structures similar to the original dither matrix.

Traditionally, the multi-dot halftoning method starts with the original dither of size m by n. The method then tiles M of the original dither matrix in the horizontal direction, and N of the original dither matrix in the vertical direction to form the large matrix of size Mm by Nn. Additional levels are then added into the large matrix by putting in levels with finer divisions than the original dither matrix.

As an example, the original dither matrix has levels 0, 4, 8 and so on. Four of the dither matrices are tiled together with one in each quadrant of a Cartesian coordinate system. The large matrix will add in levels 1, 2, 3 and so on. The added levels follow a specific pattern. One specific pattern that is favored is a cross. In one type of cross, for the levels from 0 to 3, the original matrix in the fourth quadrant still retains the level 0; the matrix in the second quadrant gets the level 1; the matrix in the first quadrant gets the level 2; and the matrix in the third quadrant gets the level 3. If one follows the sequence of the levels from 0 to 3, one generates a cross.

Figure 1:
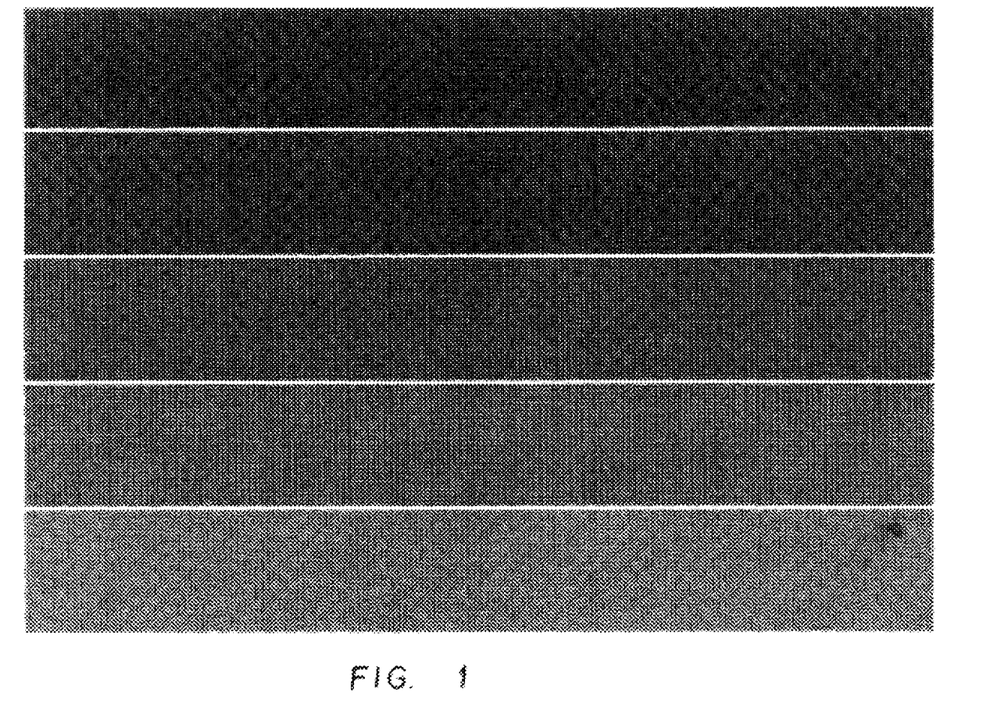
FIG. 1 shows a portion of a prior art gray-ramp with banding artifacts.

The traditional multi-dot halftoning method has a number of problems. For example, FIG. 1 shows a portion of a gray-ramp printed with that method. Only five gray levels are printed. The printing is done with a Hewlett Packard inkjet printer, the HP Design Jet 650C. The intensity of each gray level printed should be uniform. However, note the banding artifacts or the lines across each gray level, which create many non-uniform regions.

Figure 2A:
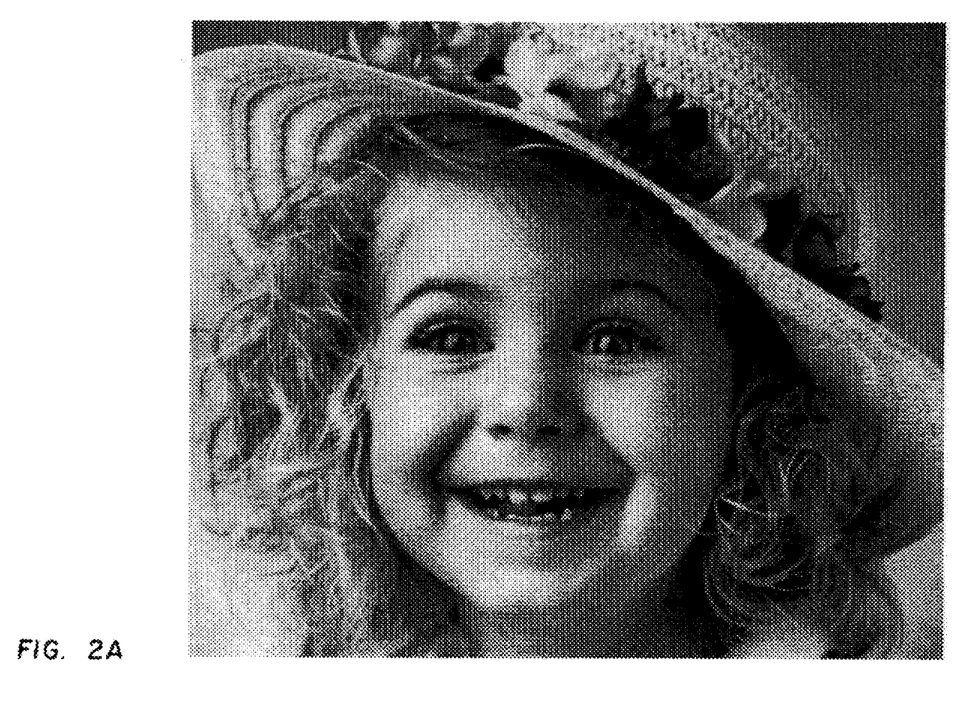
FIG. 2A shows a visually-pleasing non-text image generated by the present invention.
Figure 2B:
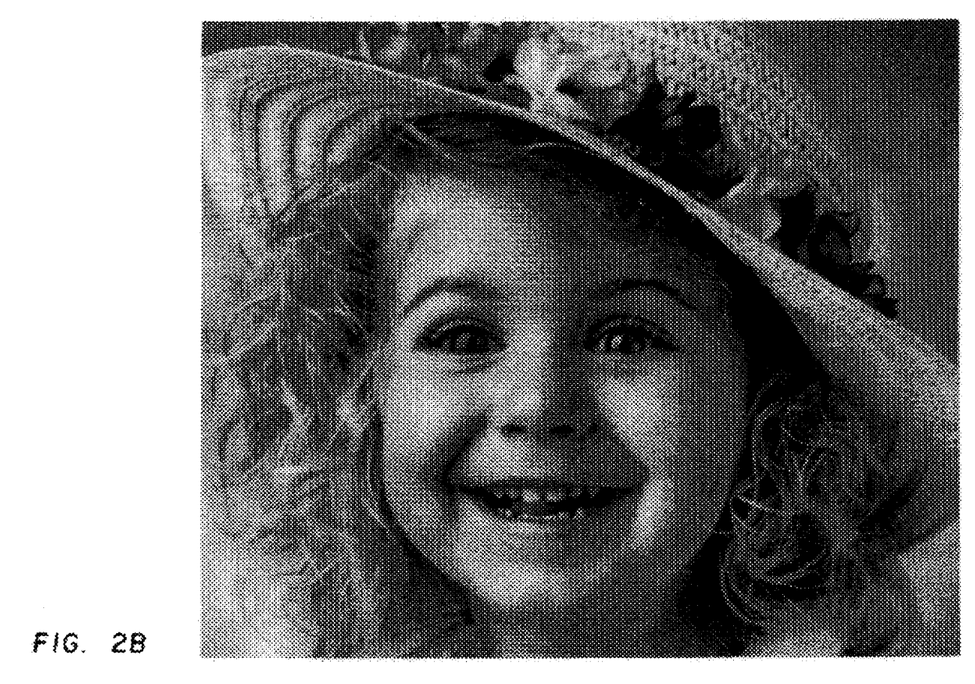
FIG. 2B shows distortions due to RET in the non-text image depicted in FIG. 2A.

Another problem of the traditional method is shown in FIGS. 2A and 2B. FIG. 2A is a visually-pleasing non-text image, and FIG. 2B is the same image printed using the RET approach, as described in the patent, "Piece-wise Print Image Enhancement for Dot Matrix Printers," by Tung, with a U.S. Pat. No. 5,005,139.

The RET approach is specifically designed to enhance characters or text images. However, if one is using a printer with the RET approach activated to print a non-text image, one may get a lot of visual distortions, such as many regions shown in FIG. 2B, as compared to FIG. 2A. This is because the RET approach involuntarily alters bits in the non-text image.

It should be apparent from the foregoing that there is still a need for an improved multi-dot halftoning method that can create a more visually-pleasing non-text image.

SUMMARY OF THE INVENTION

The present invention provides an improved multi-dot halftoning method that can significantly reduce defects in the printed images, such as banding artifacts and distortions caused by RET in printing a non-text image.

In the improved multi-dot halftoning method, in printing a halftone image from a gray-scale image, the gray-scale image is compared to a dither matrix to generate the halftone image. The dither matrix is not an ordinary dither matrix; a transformed dither matrix is generated by combining a number of original dither matrix to form a large dither matrix, which is further transformed by tuning it to correct for many non-pleasing artifacts in the printed image.

As a summary of the invented method to generate the transformed dither matrix, first, one picks an original dither matrix with a number of original levels. One preferred method to set the original levels is by extracting the dot-placement order of the original dither matrix, and establishing a set of original levels with their sequence following the dot-placement order. Then, a selected number of the original matrix is tiled together to build the large dither matrix.

To correct for artifacts, the large dither matrix is transformed. The transformation process starts with splitting every original level in the tiled matrices into a group of finer levels that are in sequence and are all different from each other. Each original level in each of the tiled matrices is replaced by one of its finer levels such that the sequence of finer levels in each group follows a pattern in the tiled matrices. For each original level, this step of replacement is repeated for all the possible patterns in the tiled matrices, and the pattern that creates the most visually-pleasing image is selected. The selected pattern for each original level is then incorporated into the large dither matrix to form the transformed dither matrix. Finally, all the finer levels are re-scaled so that they fit into a selected range for printing the non-text image.

In one preferred embodiment, the method to select the best pattern for each original level is to generate and to print gray-ramps for all the patterns; all the gray-ramps are compared visually, and the pattern that generates the most visually-pleasing gray-ramp is selected.

In another preferred embodiment, the method to select the best pattern for each original level is specifically geared towards correcting artifacts in a halftone-non-text image printed with Resolution Enhancement Technology (RET) activated. Instead of printing gray-ramps, one generates, based on RET, the bit-maps of the gray-ramps of each possible pattern for each original level. The gray-ramps are stored in a storage device. For each original level, after generating all the possible gray-ramps, they are retrieved from the storage, and are compared by a processor; one of the patterns is selected, and usually is the one that RET has modified the minimum number of bits in the bit-map of the gray-ramp.

Other aspects and advantages of the present invention will become apparent from the following detailed description, which, when taken in conjunction with the accompanying drawings, illustrates by way of example the principles of the invention.

Same numerals in FIGS. 1–14 are assigned to similar elements in all the figures. Embodiments of the invention are discussed below with reference to FIGS. 1–14. However, those skilled in the art will readily appreciate that the detailed description given herein with respect to these figures is for explanatory purposes as the invention extends beyond these limited embodiments.

DETAILED DESCRIPTION OF THE INVENTION

Figure 3A:
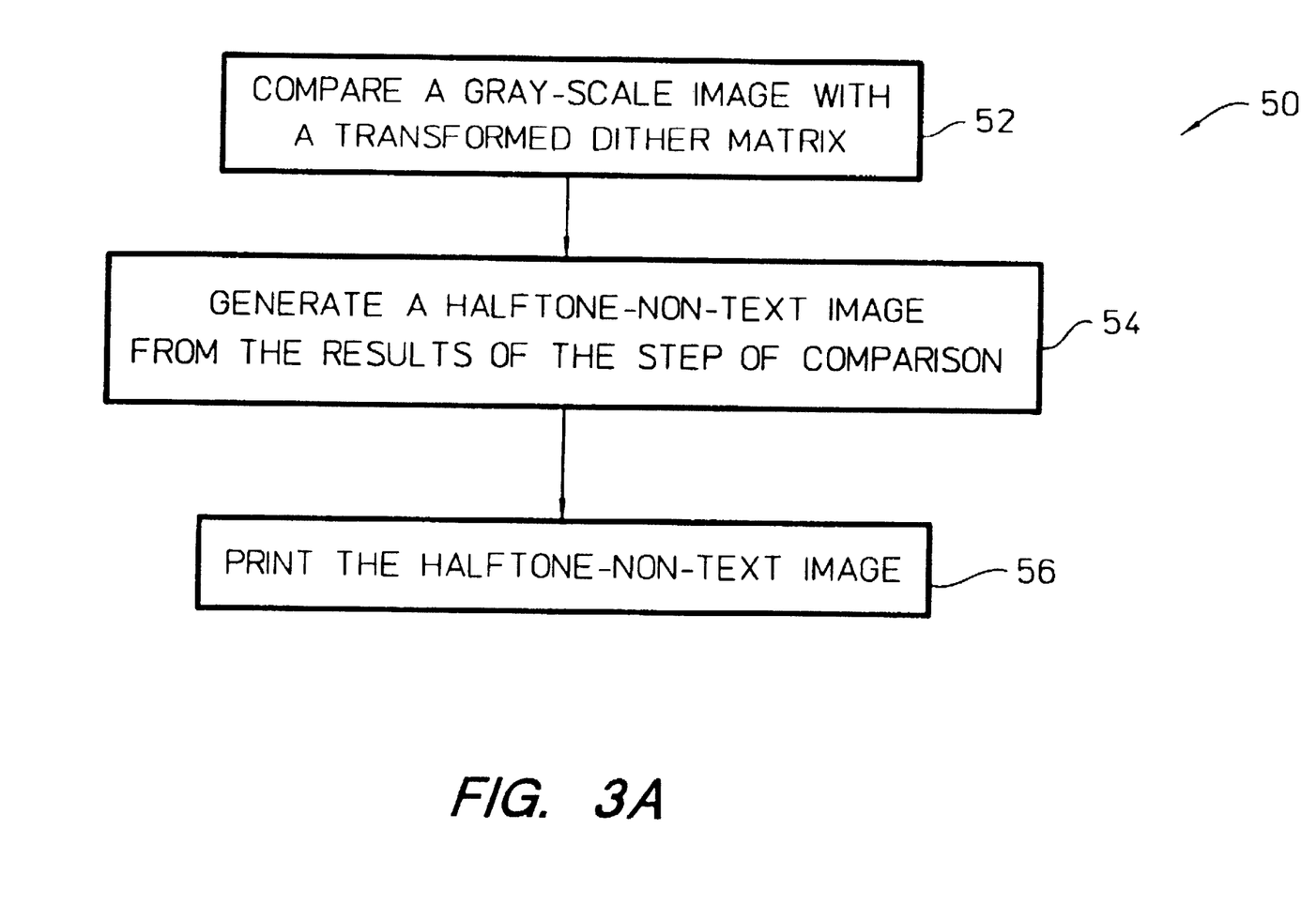
FIG. 3A shows a preferred set of steps to generate and print the non-text image in the present invention.

FIG. 3A shows a set of preferred steps of an improved multi-dot halftoning method 50 to generate and print a halftone-non-text image from a non-text gray-scale image in the present invention. First, the gray-scale image is compared, 52, to a transformed dither matrix of the present invention. This is a pixel-to-pixel comparison. From the result of the comparison, a halftone-non-text image is generated, 54, and printed 56 by a printer. A typical comparison of a gray-scale image with an ordinary dither matrix to generate and to print a halftone image is known in the art, and will not be further described in this application.

Figure 3B:
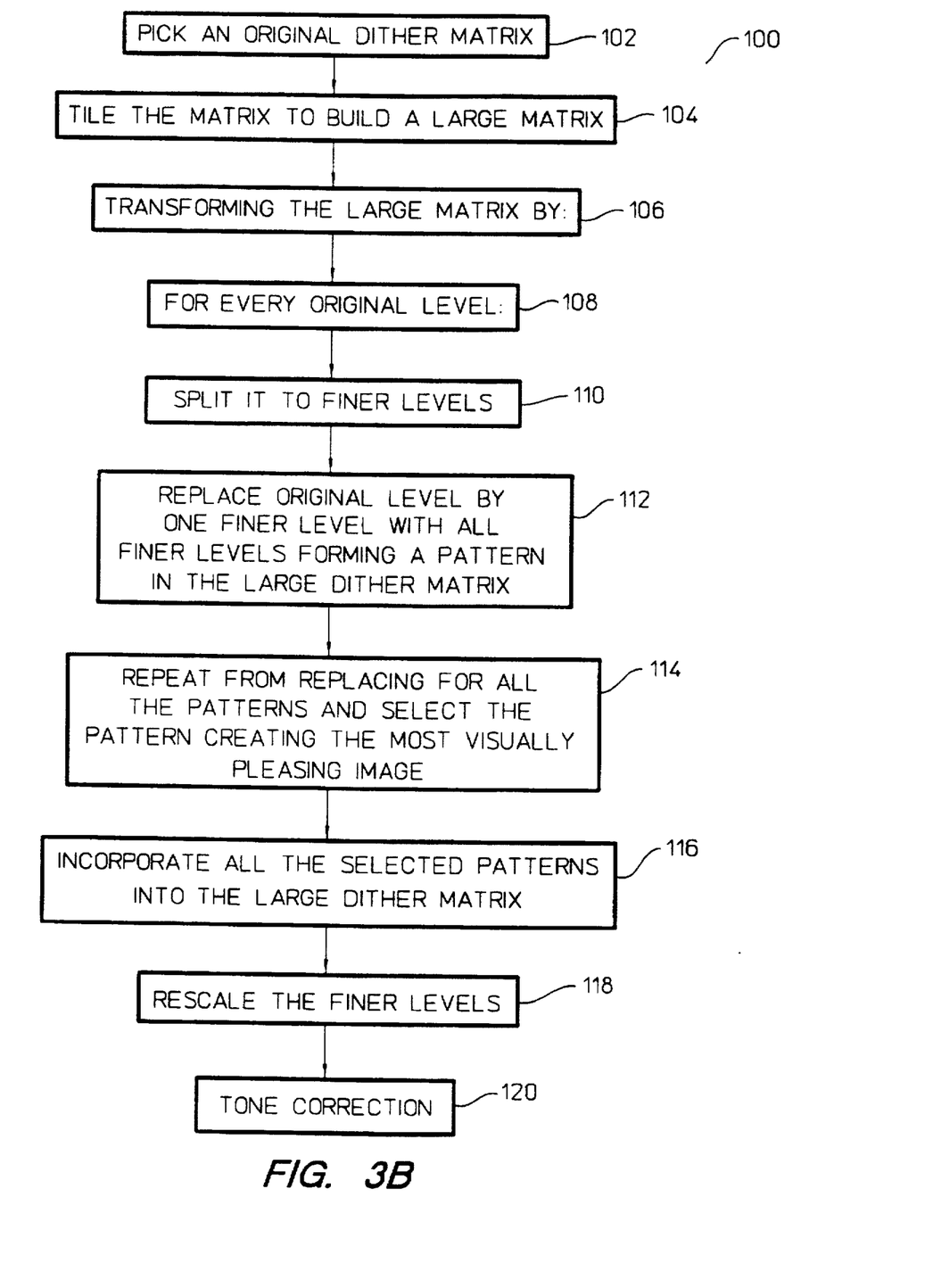
FIG. 3B shows a preferred set of steps to generate a transformed dither matrix for an improved multi-dot halftoning process in the present invention.

FIG. 3B shows a preferred set of steps 100 to generate the transformed dither matrix for the improved multi-dot halftoning process in the present invention.

Figure 4:
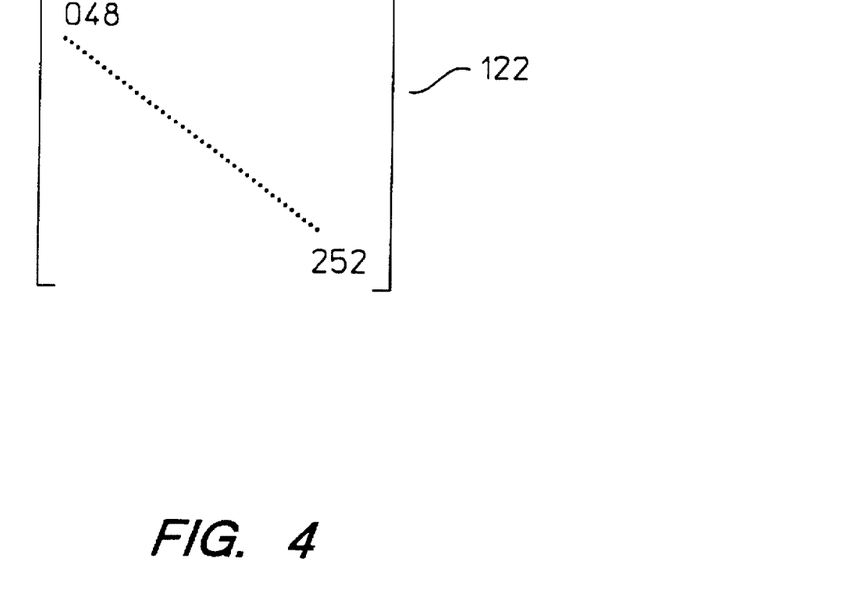
FIG. 4 shows an example of an original dither matrix in the present invention.

First, an original dither matrix with a number of original levels is picked, 102, for printing the image. FIG. 4 shows an example of an original dither matrix 122, with a number of original levels, such as levels 0, 4, 8 to 252. Note that other than the level 0, all the other levels are multiples of 4, totally 64 levels. In this example, the original levels are set already.

Figure 5:
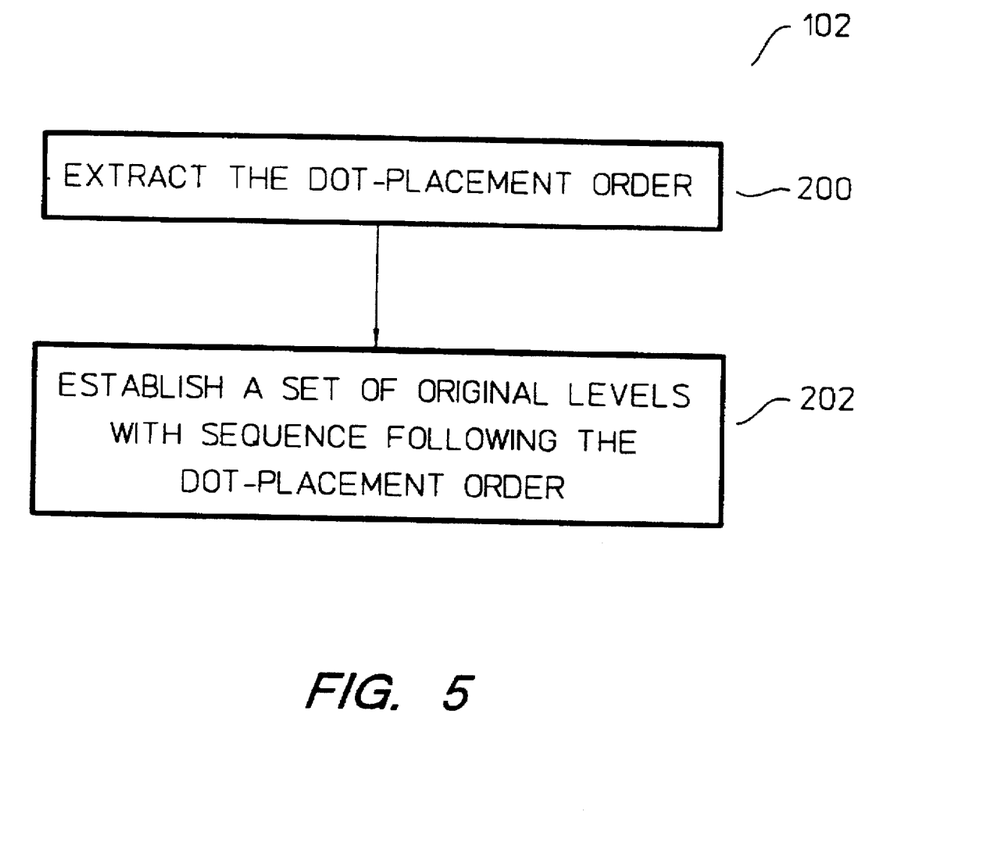
FIG. 5 shows a preferred set of steps to pick the original levels in the original dither matrix of the present invention.
Figure 6:
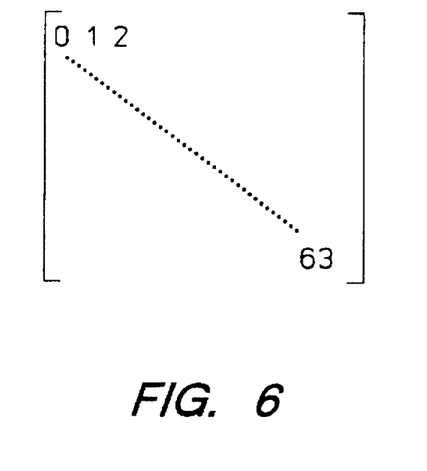
FIG. 6 shows the original levels following the dot-placement order in the original dither matrix of the present invention.

FIG. 5 shows another preferred set of steps to pick, 102, the original levels in the original dither matrix 122. The methods illustrated start with extracting, 200, the dot-placement order of the dither matrix. In the matrix shown in FIG. 4, level 0 is printed before level 4, which is printed before level 8. The original levels are then established, 202, with their sequence following the dot-placement order. FIG. 6 shows the corresponding original levels following the dot-placement order of levels 0, 4, 8 and 252 in the original dither matrix 122. This matrix will be used as the original matrix in the following description.

Figure 7:
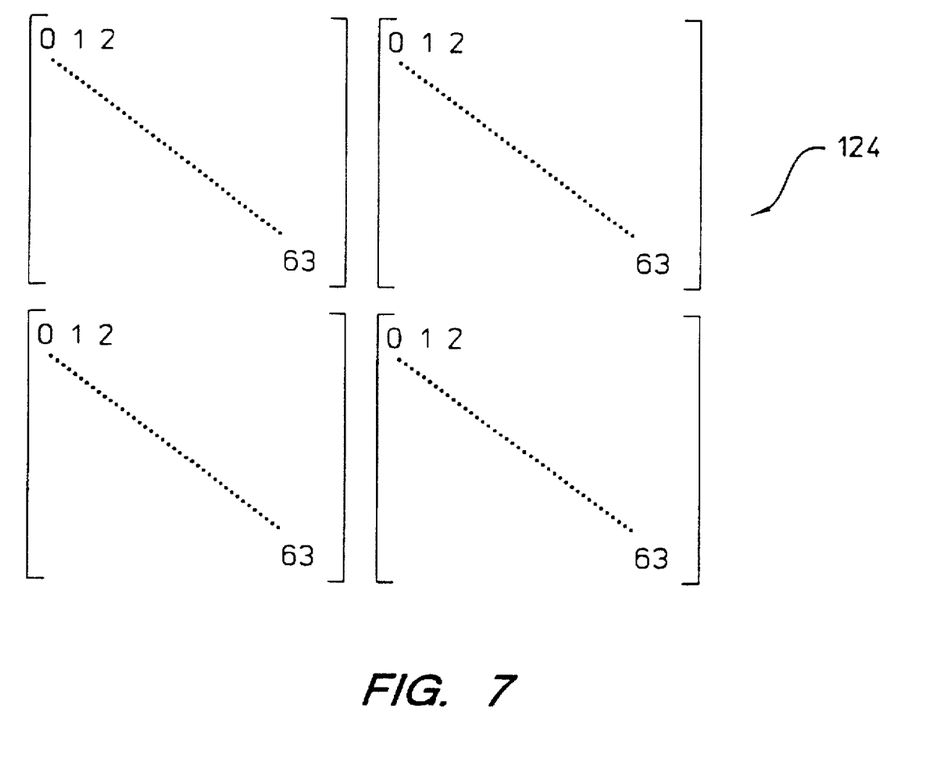
FIG. 7 shows an example of a large dither matrix formed by tiling 4 original matrix in the present invention.

After the original matrix with the original levels are picked, a selected number of the original matrix are tiled, 104, to build a large dither matrix, 124, as shown in FIG. 7. The large dither matrix 124 is transformed, 106, so that the image printed becomes more visually pleasing.

Figure 8A:
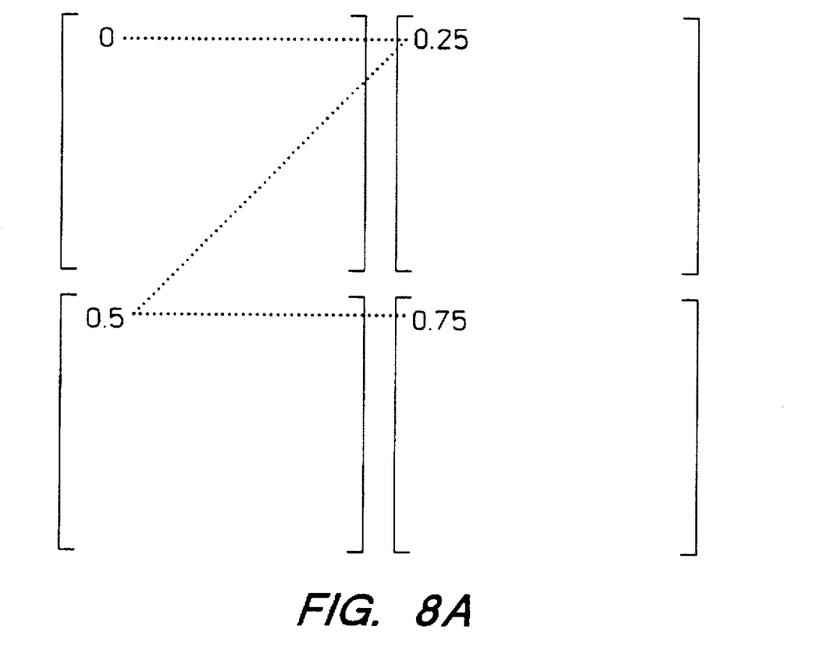
FIGS. 8A–8B show the finer levels following two different sequences, with their corresponding patterns generated.
Figure 8B:
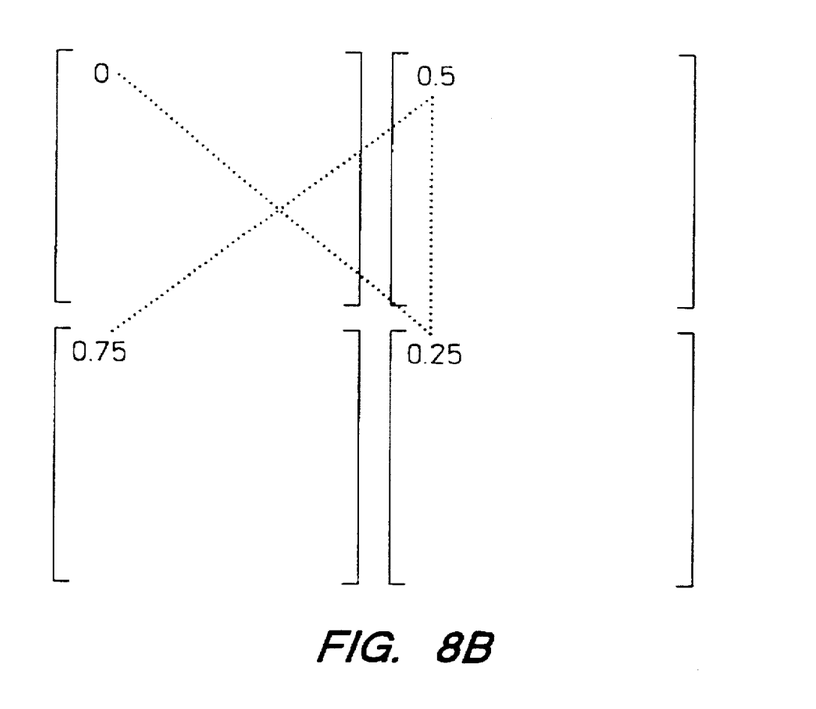

The transformation process, 106, starts with every original level, 108, in the large matrix, 124. Each level is split, 110, to create a group of finer levels that are in sequence and are all different from each other. For example, the level 0 is split into the group—0, 0.25, 0.5 and 0.75. Then a processor will replace each of the original level in each of the tiled matrices by one of the finer levels. After the replacement, the sequence of finer levels follows a pattern in the large dither matrix, 124. FIG. 8A shows the finer levels following one sequence, with the pattern generated in the shape of a "Z", as shown by the dotted line; and FIG. 8B shows the finer levels following another sequence, with the pattern generated in the shape of a cross, again as shown by the dotted line.

The step of replacing is repeated, 114, for all the possible patterns, and the pattern that creates the most visually-pleasing image is selected.

Figure 9:
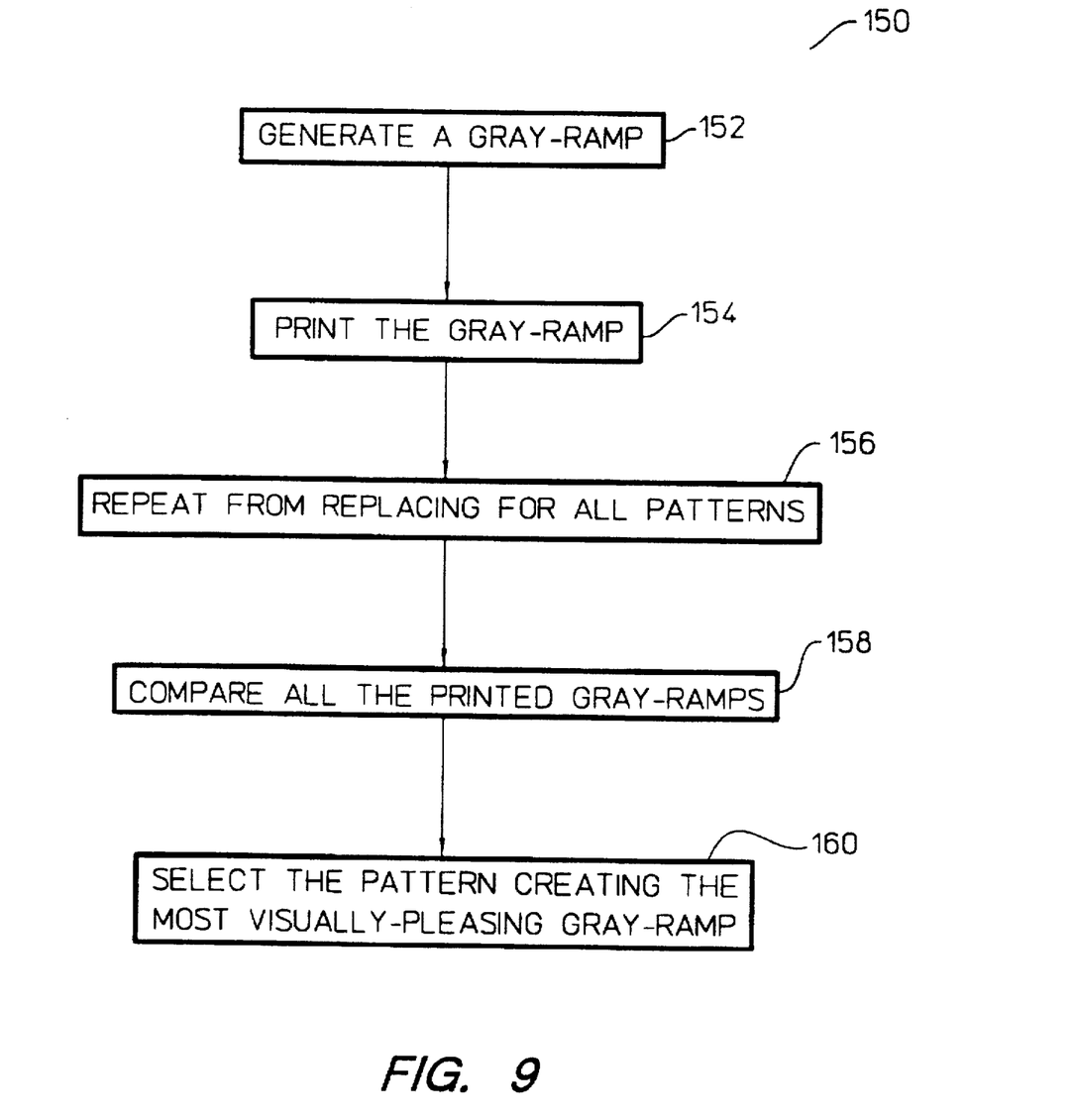
FIG. 9 shows a first preferred set of process steps to select the desired pattern in the present invention.

FIG. 9 shows a first preferred set of process steps, 150, to select the desired pattern. In this set of steps, for every orignial level, a gray-ramp at least in the areas with that original level is generated, 152, for each of the possible patterns. The gray-ramp for each pattern is printed, 154, by a printer. All the gray-ramps are compared, 158, visually by a user. Based on the comparison, the user selects, 160, the pattern that creates the most visually-pleasing gray-ramp for that original level.

Sometimes, none of gray-ramps printed for an original level is visually pleasing. In such a situation, in one preferred embodiment, the pattern that forms a cross, such as the one shown in FIG. 8B, is selected. FIG. 8B is just one example of a cross. There are other patterns that have the shape of a cross, such as one can start from the first quadrant to the third quadrant, then to the fourth and finally to the second quadrant, if the four original matrices are assumed to be positioned with one in each quadrant of a Cartesian coordinate system.

Figure 10:
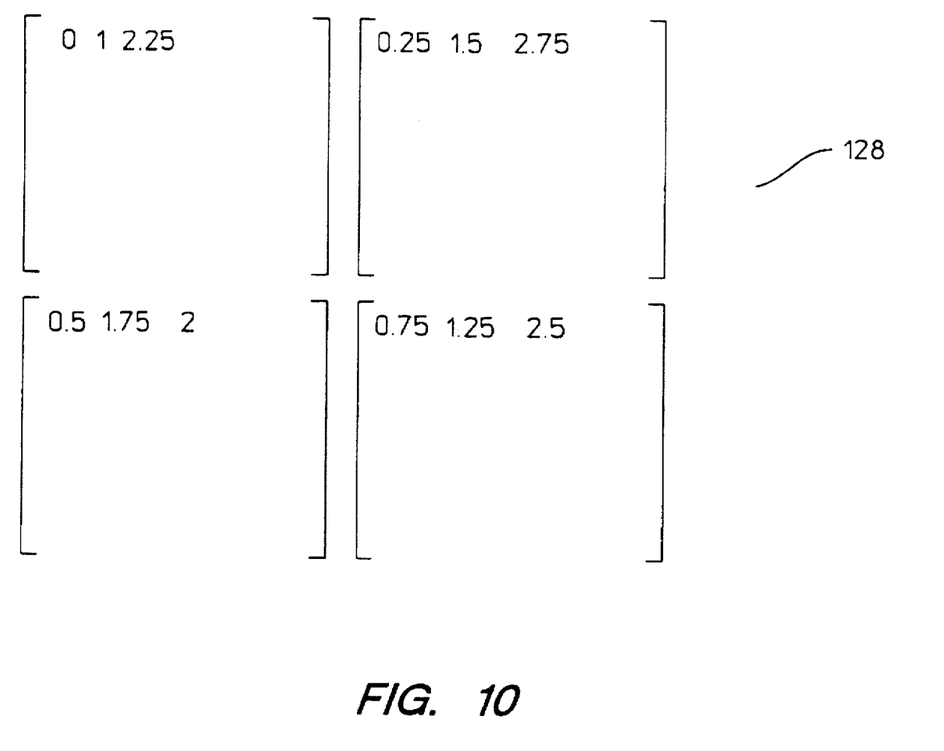
FIG. 10 shows an example of a transformed dither matrix in the present invention.

The selected pattern for each original level is incorporated, 116, into the large dither matrix to form the transformed dither matrix for printing the non-text image. FIG. 10 shows an example of such a transformed dither matrix 128. Note that the sequence of the finer levels of the original level 0 follows the pattern "Z"; the sequence of the finer levels of the original level 1 follows the pattern of a cross; and the sequence of the finer levels of the original level 2 follows the pattern of a "N".

Figure 11:
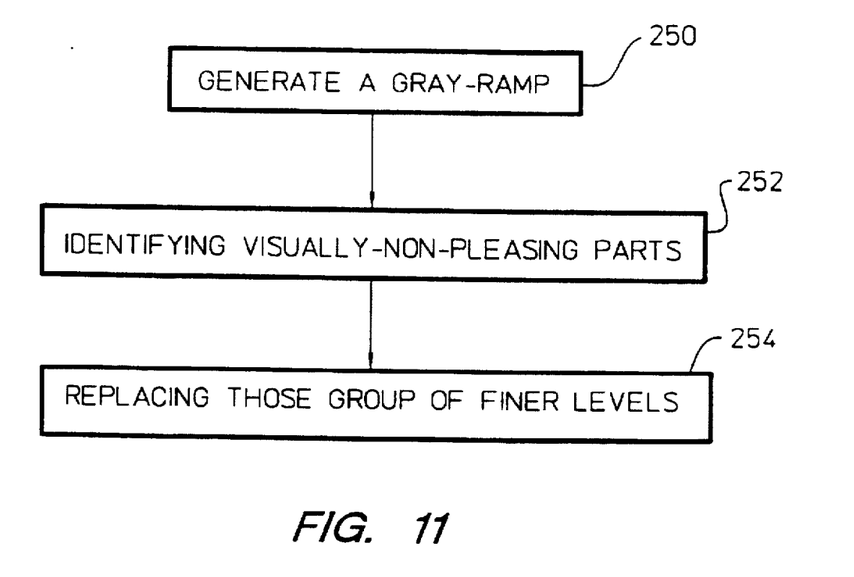
FIG. 11 shows a set of steps fine-tuning the image generated with the first preferred set of process steps shown in FIG. 9.

As pointed out earlier, there might be original levels where all the patterns are not visually pleasing; and for those levels, in one preferred embodiment, the pattern of a cross is used. FIG. 11 shows a set of steps fine-tuning the image generated with the first preferred set of process steps shown in FIG. 9. After the matrix is transformed, all the finer levels of the matrix is used to print a gray-ramp, 250. Every group of finer levels that has at least one level producing a visually-non-pleasing part on the gray-ramp is identified, 252. Each of those identified group of finer levels is replaced, 254, by their adjacent groups of finer levels. For example, the gray-ramp from the finer level 1.25 is visually-non-pleasing. The group of finer levels {1, 1.25, 1.5 and 1.75} is identified. The entire group is replaced by its adjacent group, which may either be {0, 0.25, 0.5 and 0.75} or {2, 2.25, 2.5 and 2.75}. This approach eliminates the visually non-pleasing parts at the expense of the number of finer levels.

Note that in the present example, the finer levels are within the range of 0 to 63.75. After the transformation process, in one preferred embodiment, the finer levels are re-scaled, 118, so that they fit into a selected range to print the image. This selected range may be 0 to 255, which means that all the finer levels are multiplied by 4 to fit into the selected range.

Typically, the transformed matrix has to be tone corrected according to the type of printer one is using. Tone correction is well-known in the art of dither matrix, and will not be further described in this application.

Figure 12:
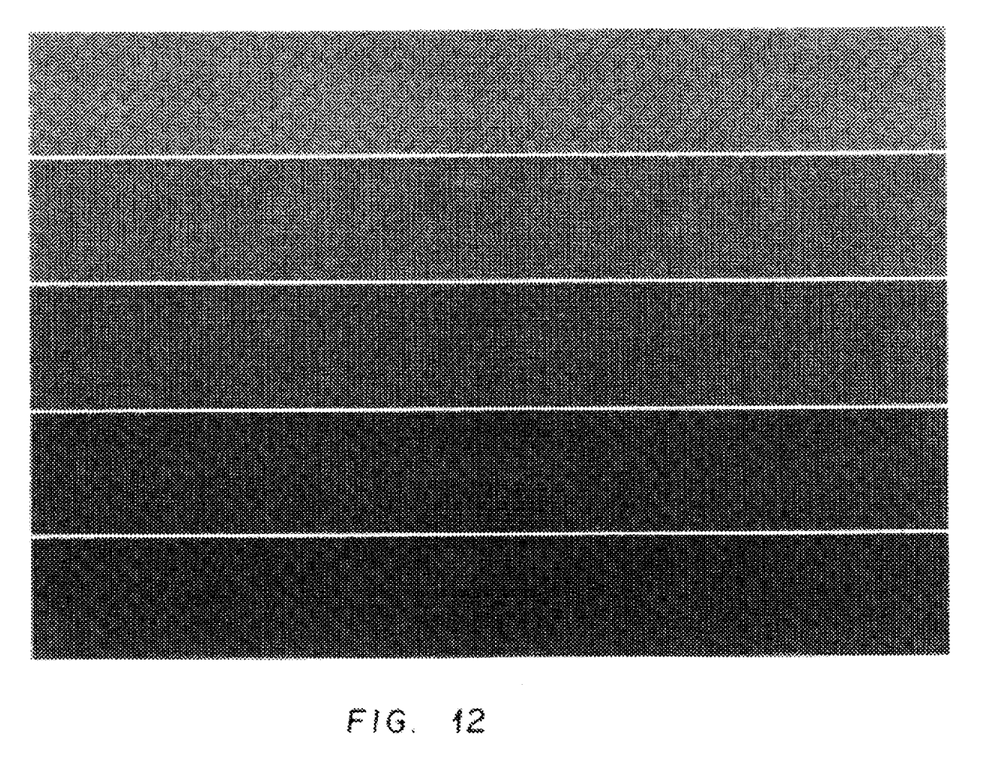
FIG. 12 shows a portion of a gray-ramp generated with the first preferred set of process steps shown in FIG. 9.

One visually-non-pleasing artifact is banding. FIG. 12 shows a portion of a gray-ramp printed based on the present invention. Again, the printing is done with a Hewlett Packard inkjet printer, the same HP Design Jet 650C printer used to print FIG. 1. Only five gray levels are printed. Note the significant reduction in the banding artifacts shown in FIG. 1.

Figure 13:
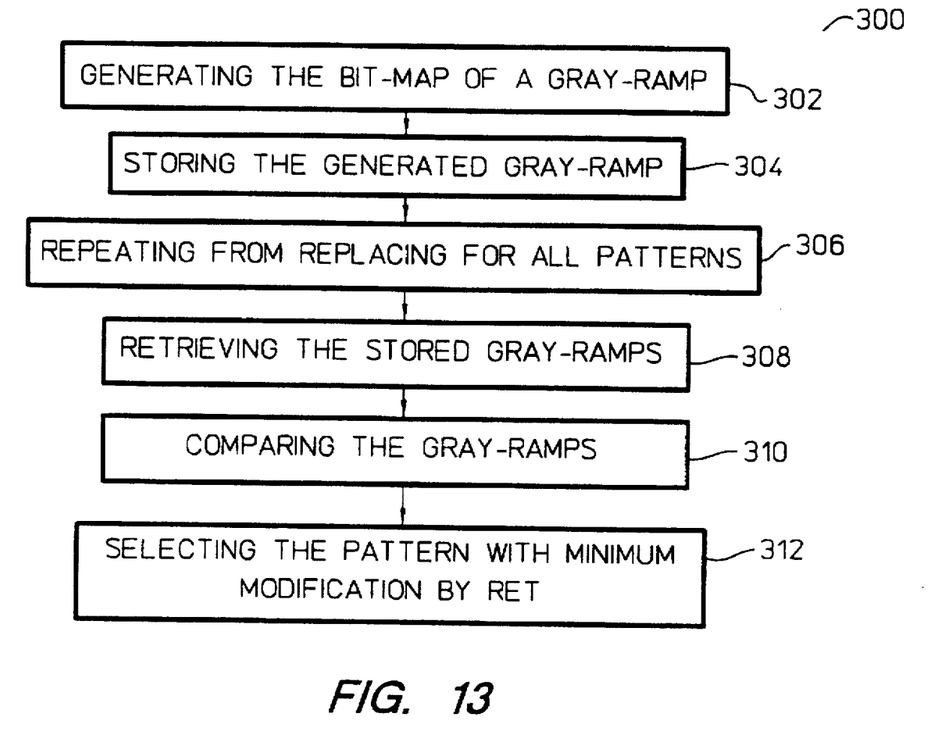
FIG. 13 shows a second preferred set of process steps to select the desired pattern in the present invention.
Figure 14:
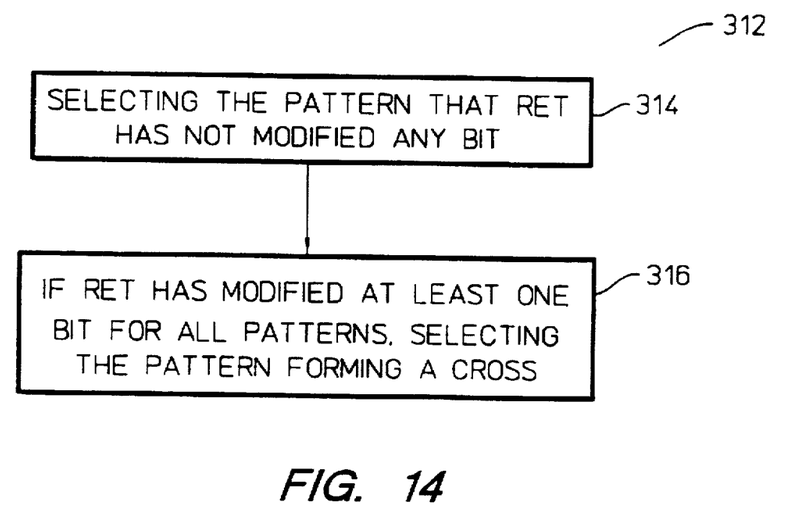
FIG. 14 shows a set of steps fine-tuning the image generated with the second preferred set of process steps shown in FIG. 13.

FIG. 13 shows a second preferred set of process steps, 300, to select the desired pattern. This set of steps is specifically designed for printing with Resolution Enhancement Technology (RET) activated. As pointed out in the background, RET is designed for printing text, and when a non-text image is printed with RET activated, there is a high probability that there will be non-pleasing artifacts in the printed image.

In the second preferred set of process steps, for every possible pattern of each orignial level, a processor generates, 302, the bit-maps of at least a part of the gray-ramp with that original level. The generated gray-ramps for all the patterns for an original level are stored, 304, in a storage device. After all the gray-ramps for an original level are generated, they are retrieved, 308, from storage, and compared, 310, by the processor. The pattern that RET has modified the minimum number of bits in the bit-map of the corresponding gray-ramp is selected, 312, by the processor.

Typically, in the step of selection, 312, there is at least one pattern that RET has not modified any bit in the bit-map of the corresponding gray-ramp. If such a situation, any one of those patterns is selected, 314. However, if RET has modified at least one bit in every pattern, then, preferably, the pattern that forms a cross is selected, 316.

Again, if there are a number of original levels that RET has modified at least one bit in every one of their patterns, certain parts of the non-text image printed may not be visually pleasing. One way to protect against such occurrences is to identify by the processor every group of finer levels that RET has modified at least one bit in one of their finer levels. For each group, if the modification resides in one or two finer levels, then the processor replaces the finer levels with one of its adjacent finer levels whose bit-maps have not been modified by RET.

As an example based on the transformed matrix in FIG. 10, if the bit-map from the finer level 2.25 has been modified by RET, and the bit-map from the finer level 2.5 has not been modified, then the finer level 2.25 will be replaced by the finer level 2.5, one of its adjacent finer levels.

FIG. 2A is printed based on the second preferred set of step, with RET activated. One can distinctively see the improvements in FIG. 2A, as compared to the image shown in FIG. 2B. Both FIGS. 2A and 2B are printed by the same laser printer, a Hewlett Packard Laser Jet IV.

The present invention allows more control over the outputs of a traditional multi-dot printing mechanism. In particular, the present invention allows a matrix designer to tune the large matrix to reduce artifacts, such as banding and RET effects on non-text images.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. A method of generating and printing a halftone-non-text image from a gray-scale non-text image comprising the steps of:

comparing the gray-scale image with a transformed dither matrix;

generating the halftone-non-text image from the results of comparing; and printing the halftone-non-text image;

wherein the transformed dither matrix is generated by the steps of:

picking an original dither matrix with a number of original levels for printing the image;

tiling a selected number of the original levels of the original matrix to build a large dither matrix;

transforming the large dither matrix by the steps of:

for every original level in the large dither matrix:

splitting that level to create a group of finer levels that are in sequence and are all different from each other;

replacing that original level in each of the tiled matrices with a processor by one of the finer levels such that the sequence of finer levels follows a pattern in the large dither matrix;

repeating the step of replacing for all the possible patterns and selecting the pattern that creates the most visually-pleasing image; and incorporating the selected pattern from each original level into the large dither matrix to form the transformed dither matrix for printing the non-text image.

2. A method as recited in claim 1 wherein the step of repeating comprises the steps of:

generating a gray-ramp by the processor at least in the areas with that original level;

printing the gray-ramp formed in the step of generating by a printer;

repeating the step of replacing for all the possible patterns;

comparing visually by a user all the printed gray-ramps in the areas with that original level; and selecting the pattern that creates the most visually-pleasing gray-ramp for that original level.

3. A method as recited in claim 1 wherein:

the original levels in the original dither matrix are selected by the steps of:

extracting a dot-placement order of the original dither matrix; and establishing a set of original levels with their sequence following the dot-placement order; and after the step of incorporating, the method further comprises the step of:

re-scaling all the finer levels so that they fit into a selected range to print the image.

4. A method as recited in claim 1 further comprising the step of tone correcting the transformed dither matrix after the step of incorporating.

5. A method as recited in claim 2 wherein the step of selecting the pattern further comprises the step of selecting the pattern that forms a cross if all the gray-ramps printed are not visually pleasing.

6. A method as recited in claim 5 wherein after the step of incorporating, the method further comprises the steps of:

generating a gray-ramp based on all the finer levels of the transformed dither matrix;

identifying every group of finer levels that has at least one finer level in it producing a visually-non-pleasing part of the gray-ramp; and replacing each of those identified groups of finer levels by their adjacent groups of finer levels.

7. A method as recited in claim 2 wherein the most visually-pleasing gray-ramp has the minimal amount of banding artifacts.

8. A method as recited in claim 1 wherein:

the printing step has Resolution Enhancement Technology (RET) activated; and the step of repeating comprises the steps of:

generating by the processor, with said RET activated, the bit-map of at least a part of the gray-ramp with that original level;

storing the generated gray-ramp in a storage device;

repeating the step of replacing for all the possible patterns;

retrieving the stored gray-ramps;

comparing by the processor all the retrieved gray-ramps in the area with that original level; and selecting, for that original level, by the processor, the pattern that said RET has modified the minimum number of bits in the bit-map of the corresponding gray-ramp.

9. A method as recited in claim 8 wherein:

the original levels in the original dither matrix are selected by the steps of:

extracting a dot-placement order of the original dither matrix; and establishing a set of original levels with their sequence following the dot-placement order; and after the step of incorporating, the method further comprises the step of:

re-scaling all the finer levels so that they fit into a selected range to print the image.

10. A method as recited in claim 8 further comprising the step of tone correcting the transformed dither matrix after the step of the incorporating.

11. A method as recited in claim 8 wherein the step of selecting the pattern comprises the steps of:

selecting the pattern that said RET has not modified any bit in the bit-map of the corresponding gray-ramp; and if said RET has modified at least one bit in every pattern, then selecting the pattern that forms a cross.

12. A method as recited in claim 11 wherein after the step of incorporating, the method further comprises the steps of:

for each group of finer levels:

identifying from the transformed dither matrix that said RET has modified at least one bit in one finer level in the bit-map; and if the modification resides in one or two finer levels, then replacing the finer levels with one of its adjacent finer levels whose bit-maps have not been modified by said RET.

* * * * *